United States Patent
Stojkovic et al.

(10) Patent No.: US 11,225,129 B2
(45) Date of Patent: Jan. 18, 2022

(54) METHOD OF MOUNTING A ROOF RACK ON A VEHICLE HAVING A REMOVABLE ROOF

(71) Applicant: Ford Global Technologies, LLC, Dearborn, MI (US)

(72) Inventors: Dragan B. Stojkovic, Taylor, MI (US); Colleen Marie Hoffman, Canton, MI (US); Jack Marchlewski, Saline, MI (US); Joshua Robert Hemphill, White Lake, MI (US); Ronald M. Lovasz, Allen Park, MI (US); Mathias A. Huber, Brighton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/831,463

(22) Filed: Mar. 26, 2020

(65) Prior Publication Data

US 2020/0223298 A1    Jul. 16, 2020

Related U.S. Application Data

(62) Division of application No. 15/951,803, filed on Apr. 12, 2018, now Pat. No. 10,632,825.

(51) Int. Cl.
*B60J 7/11*    (2006.01)
*B60J 7/14*    (2006.01)
*B60R 9/058*    (2006.01)

(52) U.S. Cl.
CPC . *B60J 7/11* (2013.01); *B60J 7/14* (2013.01); *B60R 9/058* (2013.01)

(58) Field of Classification Search
CPC ................ B60J 7/11; B60J 7/14; B60R 9/058

USPC .......................................................... 296/218
See application file for complete search history.

(56) References Cited

U.S. PATENT DOCUMENTS

| | | | |
|---|---|---|---|
| 5,738,405 A | 4/1998 | Richters et al. | |
| 6,152,339 A * | 11/2000 | Kreisler | B60R 9/00 224/309 |
| 6,425,508 B1 * | 7/2002 | Cole | B60R 9/045 224/320 |
| 6,428,090 B1 | 8/2002 | Reinsch | |
| 6,530,621 B1 | 3/2003 | Williams et al. | |
| 6,755,332 B2 | 6/2004 | Crane et al. | |

(Continued)

OTHER PUBLICATIONS

Website http://www.perrycraft.com/p-2421-dynasport-roof-rails-no-crossbars-br-blackbr-add-mb-load-bars-for-load-carrying-capacity-up-to-220-lbs.aspx Perrycraft Inc., DynaSport Roof Rails—No Crossbars Black Add MB Load Bars for load-carrying capacity up to 220 lbs!, Copyright 2015, Retrieved from the Web Jan. 8, 2018, 2 Pages, South Sparta, North Carolina, US.

*Primary Examiner* — Peter N Helvey
(74) *Attorney, Agent, or Firm* — David L. Coppiellie; Brooks Kushman P.C.

(57) ABSTRACT

A vehicle including a passenger compartment having a roof support framework including a pair of roof rails, a header and at least one roof bow. A roof including several rigid removable roof panels is removably assembled to the roof support framework. Pins are removably assembled to the roof rails or to brackets attached to the roof rails that extend through the roof panels. A roof rack or cargo carrier is removably attached to upper ends of the pins and is spaced above the roof panels. A method of assembling a roof rack to a vehicle is also disclosed.

3 Claims, 6 Drawing Sheets

(56) References Cited

U.S. PATENT DOCUMENTS

| | | |
|---|---|---|
| 6,851,739 B2 | 2/2005 | Morley |
| 7,163,260 B2 | 1/2007 | Reitzloff et al. |
| 7,213,854 B2 | 5/2007 | Dowdey et al. |
| 7,367,615 B1 | 5/2008 | Fallis, III et al. |
| 7,914,064 B2 | 3/2011 | Joab |
| 8,991,896 B1 | 3/2015 | Whitehead |
| 9,114,690 B1 | 8/2015 | Bowles et al. |
| 9,187,046 B2 * | 11/2015 | Peck ......................... B60R 9/10 |
| 2005/0023314 A1 | 2/2005 | Williams et al. |
| 2005/0134096 A1 | 6/2005 | Fallis, III et al. |
| 2010/0038933 A1 | 2/2010 | Comfort et al. |
| 2011/0101056 A1 | 5/2011 | Barkey |
| 2016/0046241 A1 | 2/2016 | Crismon et al. |

\* cited by examiner

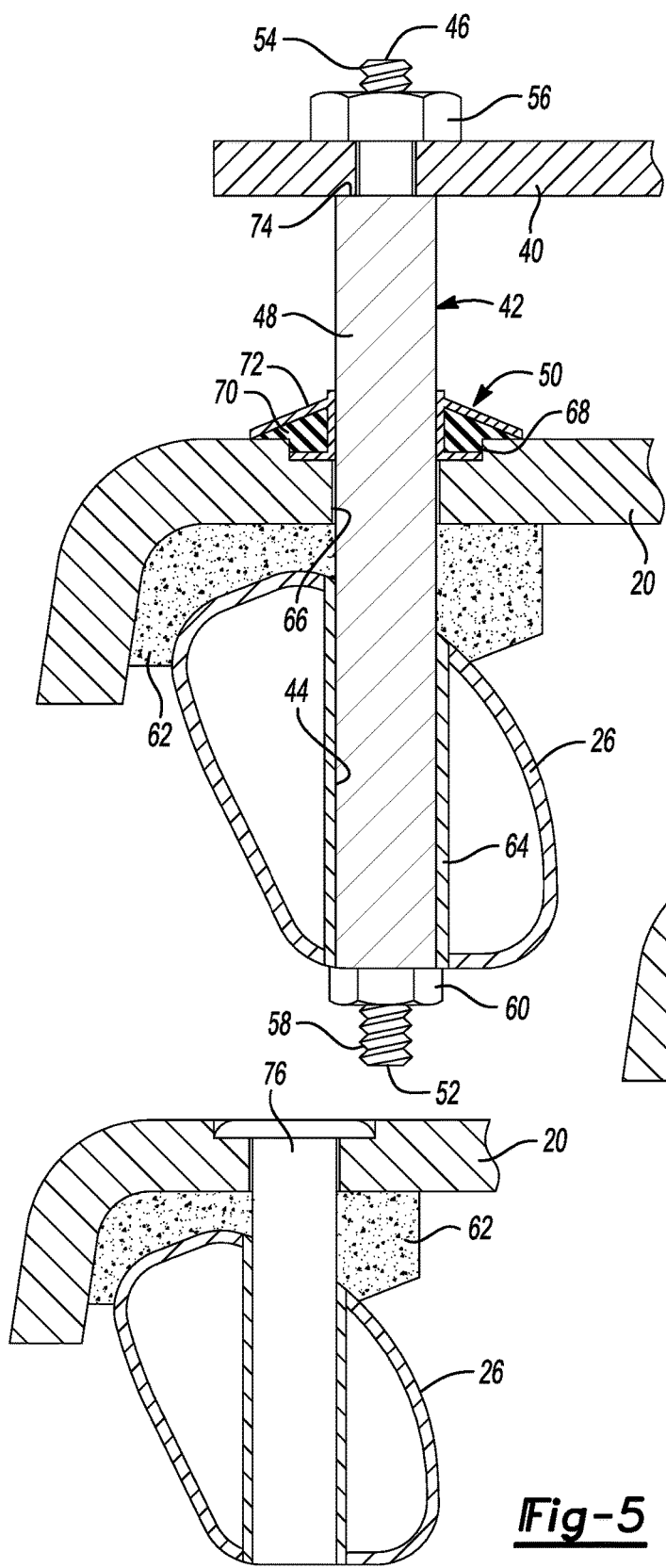
Fig-4
Fig-5
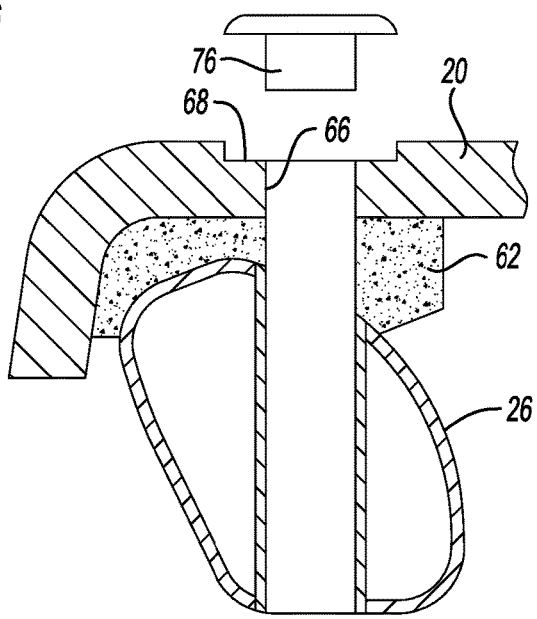
Fig-6

METHOD OF MOUNTING A ROOF RACK ON A VEHICLE HAVING A REMOVABLE ROOF

REFERENCE TO RELATED APPLICATIONS

This application is a division of U.S. application Ser. No. 15/951,803 filed Apr. 12, 2018, now U.S. Pat. No. 10,632,825 issued Apr. 28, 2020, the disclosure of which is hereby incorporated in its entirety by reference herein.

TECHNICAL FIELD

This disclosure relates to vehicles having a roof formed by removable panels that may be outfitted with a roof rack.

BACKGROUND

Sport utility vehicles may be equipped with a removable roof that functions to cover the passenger compartment and may also be removed to provide an open-air driving experience. Removable roofs may be one-piece shells, or may have panels made of textile materials or rigid panels that are attached to roof rails and roof bows.

Roof racks are commonly provided on sport utility vehicles that have a hardtop roof. A roof rack provides added cargo carrying capability for the vehicle above the passenger compartment.

Roof racks are not normally provided on sport utility vehicles that have a removable roof because the roof rack interferes with removal and installation of the removable roof. While one-piece removable roof may be provided with a roof rack, when the roof shell is removed the roof rack must also be removed and stored. Roof racks must be assembled to the roof of a vehicle in such a way as to avoid water leakage and wind noise. Roof racks are generally not designed to be selectively removable but are normally permanently assembled to the roof and remain attached to the roof and increase drag even if nothing is being carried on the roof rack.

This disclosure is directed to solving the above problems relating to providing a removable roof rack on a vehicle having a roof formed by a plurality of rigid removable roof panels as summarized below.

SUMMARY

According to one aspect of this disclosure, a vehicle is disclosed that includes a passenger compartment having a roof support framework including a pair of roof rails. A roof that includes several roof panels is removably assembled to the roof support framework. A plurality of pins are removably assembled to the roof rails to extend through the roof panels. A roof rack is removably attached to upper ends of the pins above the roof panels.

According to another aspect of this disclosure, a roof rack assembly is disclosed for a vehicle having framework and plural removable roof panels adapted to be assembled above the framework. The roof rack assembly comprises a cargo carrier and several support pins. The pins each have an upper end that extends above the roof panels and are assembled to the framework. The cargo carrier is attached to the upper ends of the pins.

The roof rails may define openings having an axis extending in a vertical direction, and the pins may be assembled into the openings.

The pins may be provided with a shoulder at an intermediate location on the pins that are adapted to close an opening defined by the roof panels when the roof panels are attached to the roof support framework.

The vehicle may further comprise a crush tube assembled inside each of a plurality of openings defined by the roof rails and assembled into the openings. The pins may be secured to the roof rails by a threaded connector attached to a lower end of the pins below the roof rail with the roof rack being secured to the upper end of the pins by a threaded connector.

The roof rack may be attached to the pins in a first mode with the roof panels secured to the roof support framework. The roof rack may be attached to the pins in a second mode with the roof panels not being secured to the roof support framework.

The pins may have an intermediate portion, a top portion and a bottom portion. The top and bottom portions each may have threaded ends with the intermediate portion having a larger diameter than the top and bottom portions.

The pins may be provided with a seal plug that is assembled to the pins where the top portion extends from the intermediate portion and are adapted to close an opening defined by the roof panels when the roof panels are attached to the roof support framework.

The vehicle may further comprise several brackets attached to the roof rails with the brackets each defining an opening having an axis extending in a vertical direction so that the pins may be assembled into the openings.

The roof support framework may include several pillars supporting a pair of roof rails, at least one transverse bow, and a windshield header.

The above aspects of this disclosure and other aspects will be described below with reference to the attached drawings.

BRIEF DESCRIPTION OF THE DRAWINGS

FIG. 4 is a cross-section taken along the line 3-3 in FIG. 1 with the support pins and roof rack added to the cross-section.

FIG. 5 is a fragmentary cross-section of the roof panel with a sealing cap inserted into the support pin receiving hole.

FIG. 6 is a fragmentary cross-section of the roof panel with the sealing cap separated from the support pin receiving hole.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
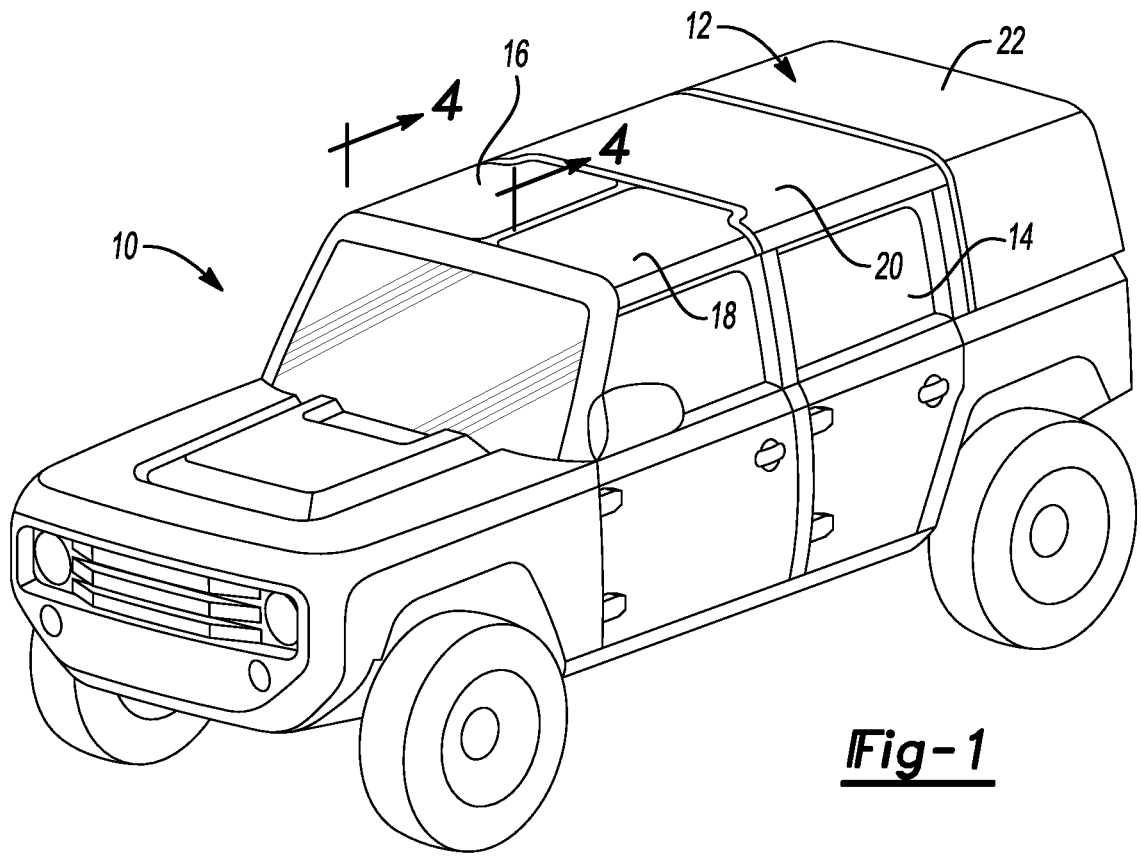
FIG. 1 is a perspective view of a sport utility vehicle having a roof formed by a plurality of removable rigid panels.

Referring to FIG. 1, a vehicle 10 is illustrated with a removable roof 12 shown covering a passenger compartment 14. The roof includes a right front panel 16 and left front panel 18 an intermediate panel 20 and a rear cap 22. The removable panels may be provided in a variety of configurations. For example, the intermediate panel 20 could be split in two like the front panels 16, 18 and the rear cap 22 could be a flat roof panel like the illustrated intermediate panel 20 or could be split like the front panels 16, 18.

Figure 2:
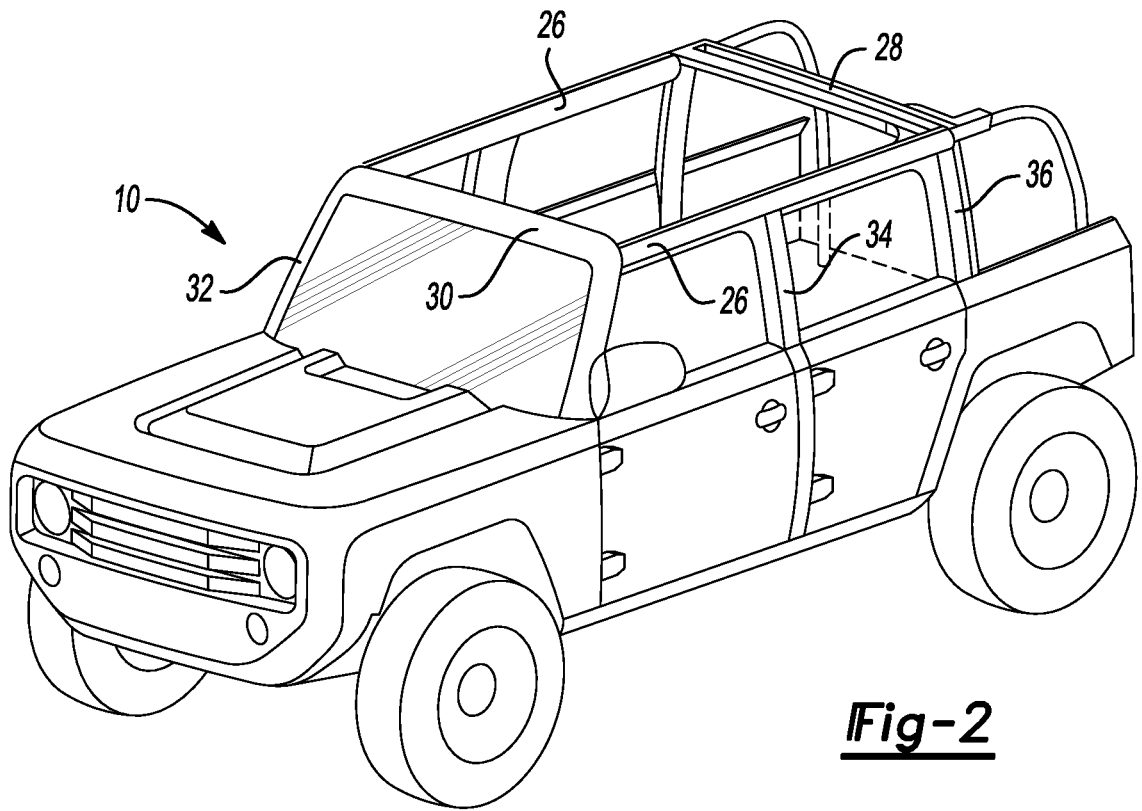
FIG. 2 is a perspective view of a sport utility vehicle having a framework for supporting a roof formed by a plurality of removable rigid panels with the rigid panels removed.

Referring to FIG. 2, the vehicle shown in FIG. 1 is illustrated with the removable roof panels 16, 18, 20, and 22 removed from the roof support framework that comprises a pair of roof rails 26, a transverse bow, and a windshield header 30. While the illustrated embodiment has only one roof bow 28, it should be understood that two or more roof bows could be provided. The roof 12 is also supported by an A-pillar 32, a B-pillar 34, and a C-pillar 36.

Figure 3:
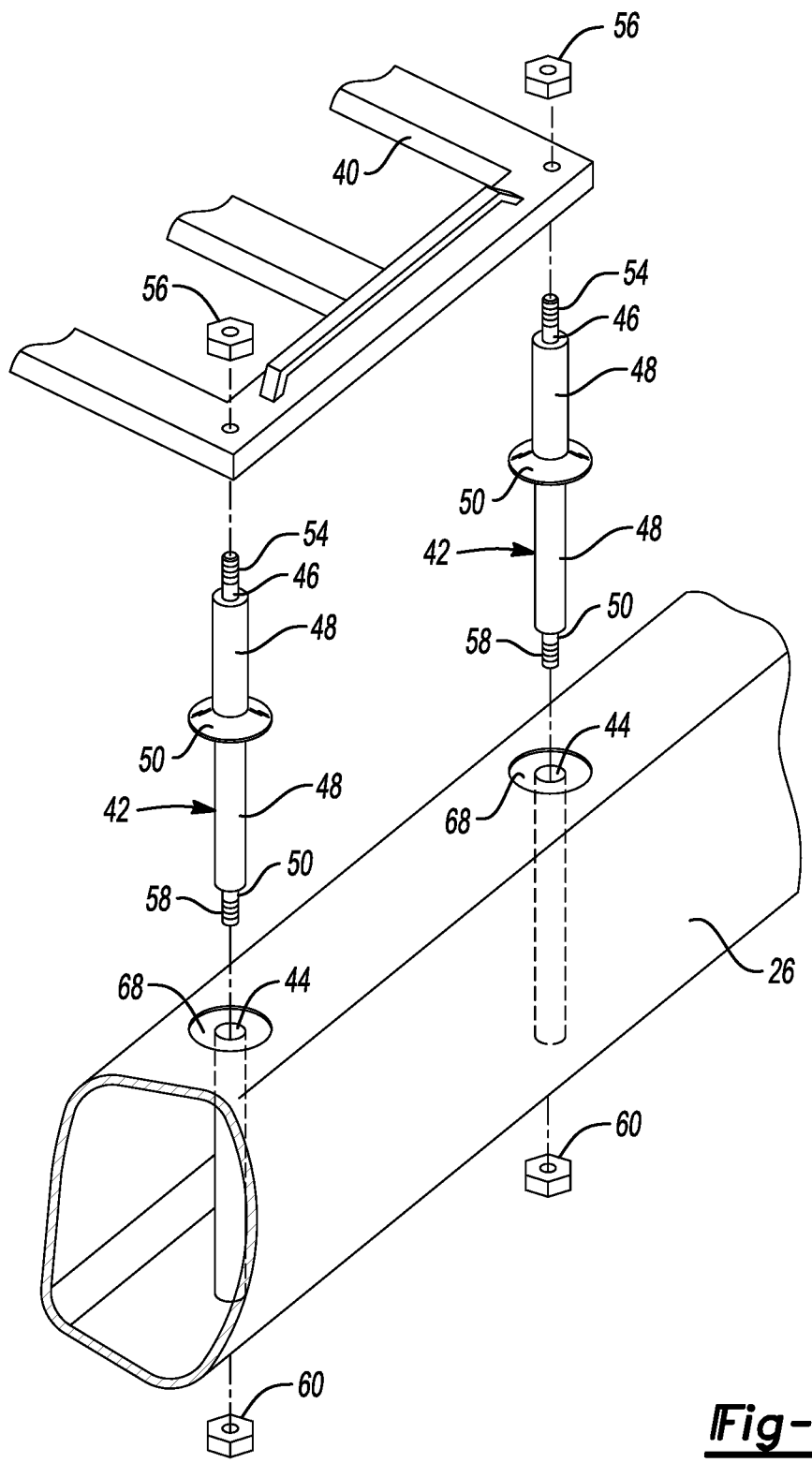
FIG. 3 is a fragmentary exploded perspective view of a roof rack or cargo carrier and two support pins attached to a roof rail.

Referring to FIG. 3, A roof rack 40, or cargo carrier, is shown in position to be assembled to two pins 42 to the roof rail 26. The pins include an upper end 46, an intermediate portion 48, shoulder ring 50, and a lower end 52. The intermediate portion 48 has a larger cross-section that the upper end 46 and the lower end 52. The shoulder ring 50 is assembled to the intermediate portion 48 but could also be formed integral to the pin 42.

The upper end 46 includes an externally threaded portion 54 that receives the nut 56 to secure the roof rack 40 to the pins 42. The lower end 50 includes an externally threaded portion 58 that receives the nut 60 to secure the pins 42 to the roof rail 26.

Referring to FIG. 4, the roof rack 40 is shown assembled to the roof panel 20 and roof rail 26. The pin 42 is assembled to the roof rail 26 through the opening 44 and is secured to the lower end 52 by the nut 60 that is received on the threaded portion 58. The opening 44 has an axis extending in a vertical direction. A crush tube 64 is assembled into the opening 44 to prevent distortion of the roof rail 26 when the roof rack 40, and roof panel 20 are tightened on the pins 42 pins. The roof panels are supported on the roof rails 26 on roof panel supports 62 that may be relatively rigid elastomeric members. The roof panel supports 62 are spaced from the pins 42 and hold the roof panels in place and dampen vibration. The roof panels are held in position by clamps (not shown) that clamp the panels to the roof rails.

Roof panel 20 is illustrated in FIG. 4 but the arrangement of the roof panels 16, 18, and 22 are similar. The roof panel 20 is preassembled to the roof panel support and assembled with the roof panel support 62 onto the roof rail 26. The Pin 42 is installed through the opening 66 in the roof panel 20. A countersink 68 is provided in the roof panel 20 above the opening 66. The shoulder ring 50 may include a seal 70 that is received inside a casing 72. The seal 70 is an elastomeric member provided to assure a seal between the pin 42 and the roof panel 20.

The cargo carrier 40 is assembled onto the upper end 46 of the pin 42 at a spaced location above the roof panel 20. The nut 56 secures the cargo carrier to a shoulder 74 on the pin 42 formed where the upper end 46 of the pin 46 and the intermediate portion 48 meet. The roof rack or cargo carrier 40 may be any one of a variety of carriers including a kayak carrier, a bicycle carrier and cargo box, or the like.

Referring to FIGS. 5 and 6, a cap plug 76 is shown installed in the roof panel 20 in FIG. 5 and is shown removed from the roof panel 20 in FIG. 6. The cap plug is used to fill the opening 66 when the pin 42 is not installed and the roof rack 40 is not needed. The cap plug 76 is partially or fully received in the counter sink 68. The roof panel 20 is shown assembled on to the roof rail 26 with the roof panel support 62 between the roof panel 20 and the roof rail 26. The cap plug is provided to close the opening 66 and may include a seal to prevent water leakage.

Figure 7:
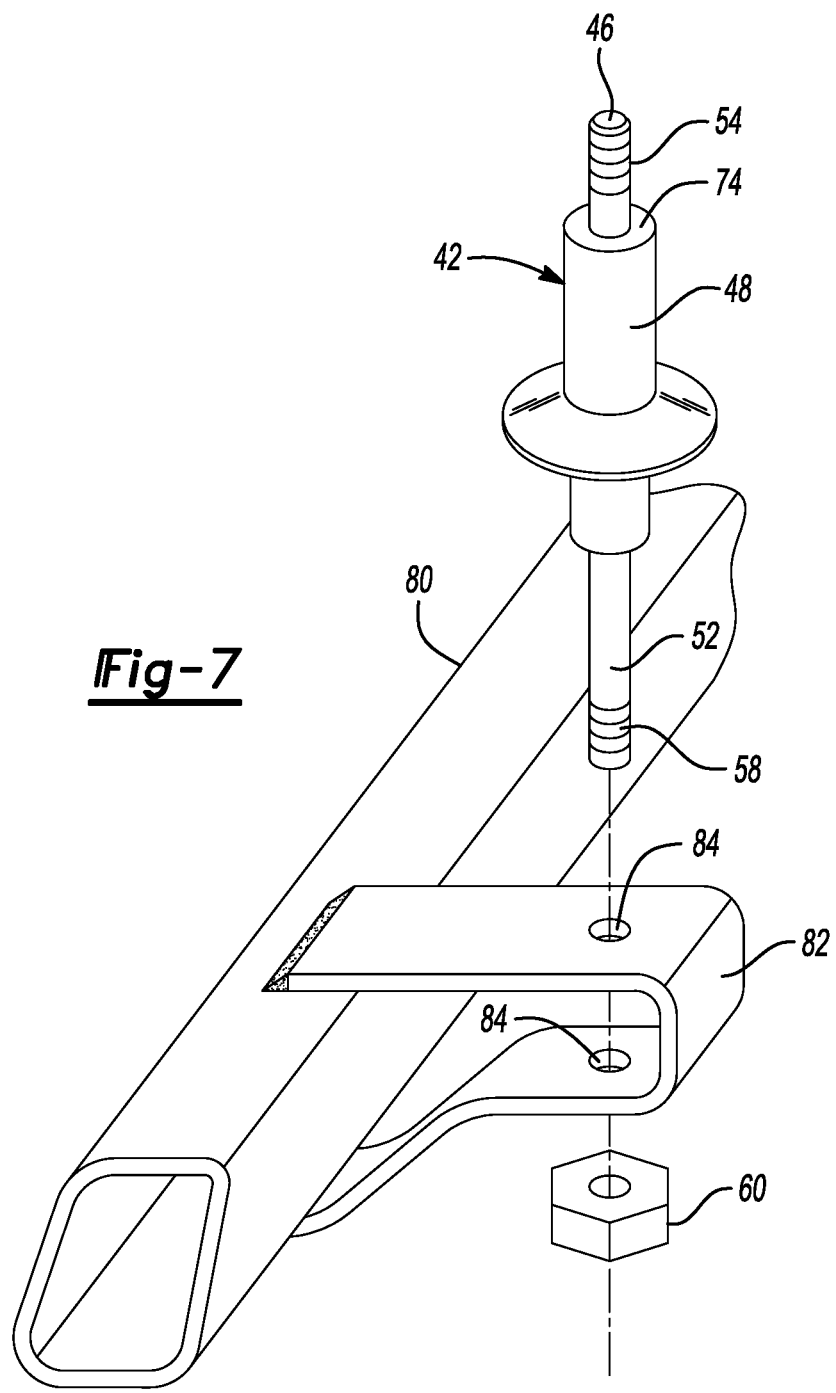
FIG. 7 is a fragmentary exploded perspective view of an alternative embodiment of the roof rack support pin received in a bracket attached to a roof rail.

Referring to FIG. 7, an alternative embodiment of a roof rack mounting arrangement for a roof made up of removable rigid panels is illustrated that uses pins 42 to support the roof rack 40. Reference numerals of components that are similar to the embodiment shown in FIGS. 1-6 are carried over in the description of FIGS. 7-10. A roof rail 80 is illustrated to which a bracket 82 is welded or otherwise permanently secured. The bracket defines an opening 84 that is adapted to receive the pin 42. The pin 42 includes the upper end 46, intermediate portion 48, shoulder ring 50, and a lower end 52 as previously described with reference to the embodiment of FIGS. 1-6. The shoulder ring 50 is assembled to the intermediate portion 48 but could also be an integral part of the pin 42.

Figure 8:
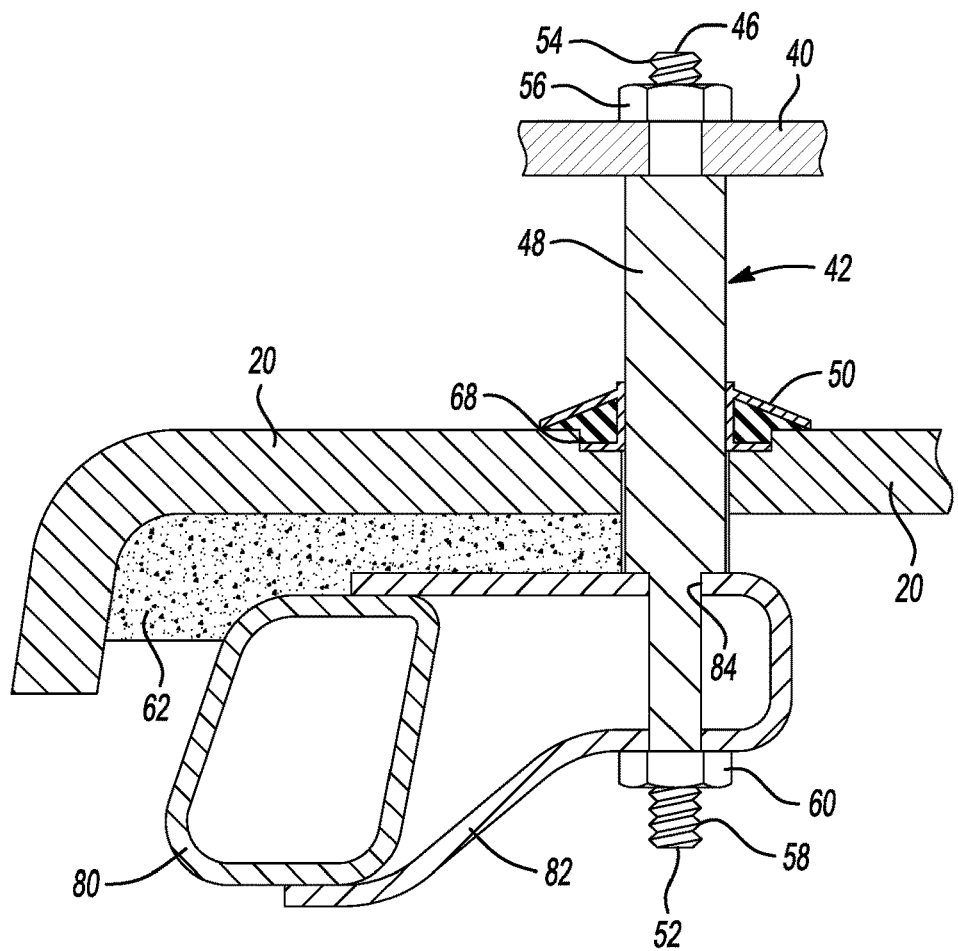
FIG. 8 is a cross section view of the embodiment of FIG. 7 shown assembled to the roof and supporting a roof rack or cargo carrier.

Referring to FIG. 8, The pin 42 is shown supporting the roof rack 40 above the roof panel 20. The upper end 56 of the pin 42 receives the roof panel 20 and is secured by the nut 56 to the threaded portion 54. The pin is assembled at the lower end 52 to the bracket 82 and extends through the opening 84 defined by the bracket 80. The nut 60 is secured to the threaded portion 58 of the lower end 52 of the pin 42. The roof panel 20 and roof panel support 62 are clamped to the roof rail 26 as previously described. The shoulder ring 50 seals between the pin 42 and the roof panels 20 and is at least partially received in the counter sink 68.

Figure 10:
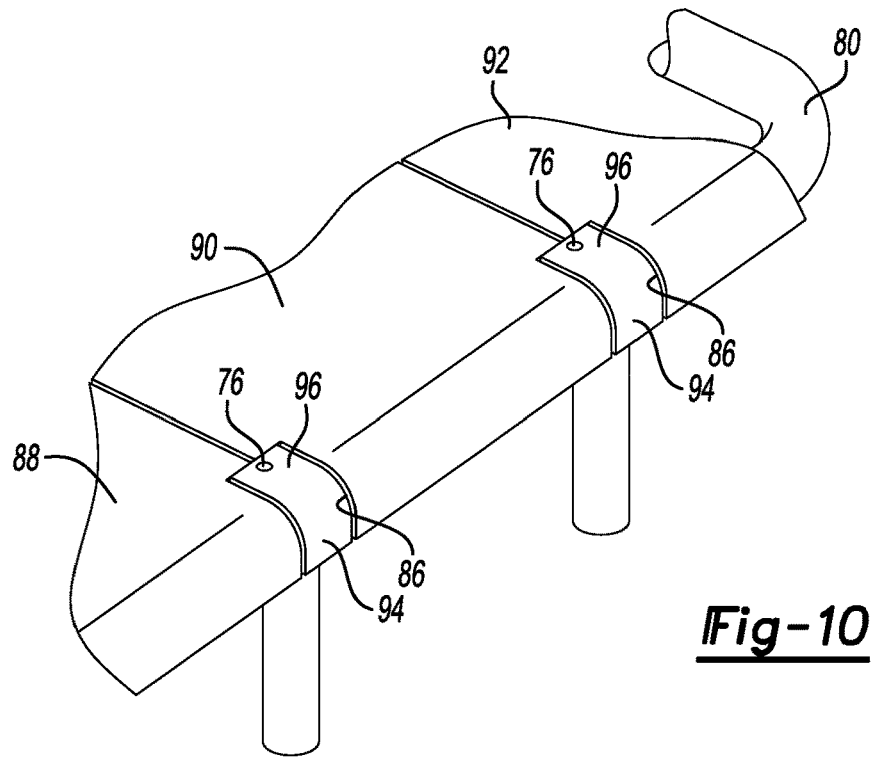
FIG. 10 is a fragmentary perspective view of the embodiment of FIG. 7 including roof panels and trim pieces attached to the roof rail with cap plugs inserted in the trim pieces.
Figure 9:
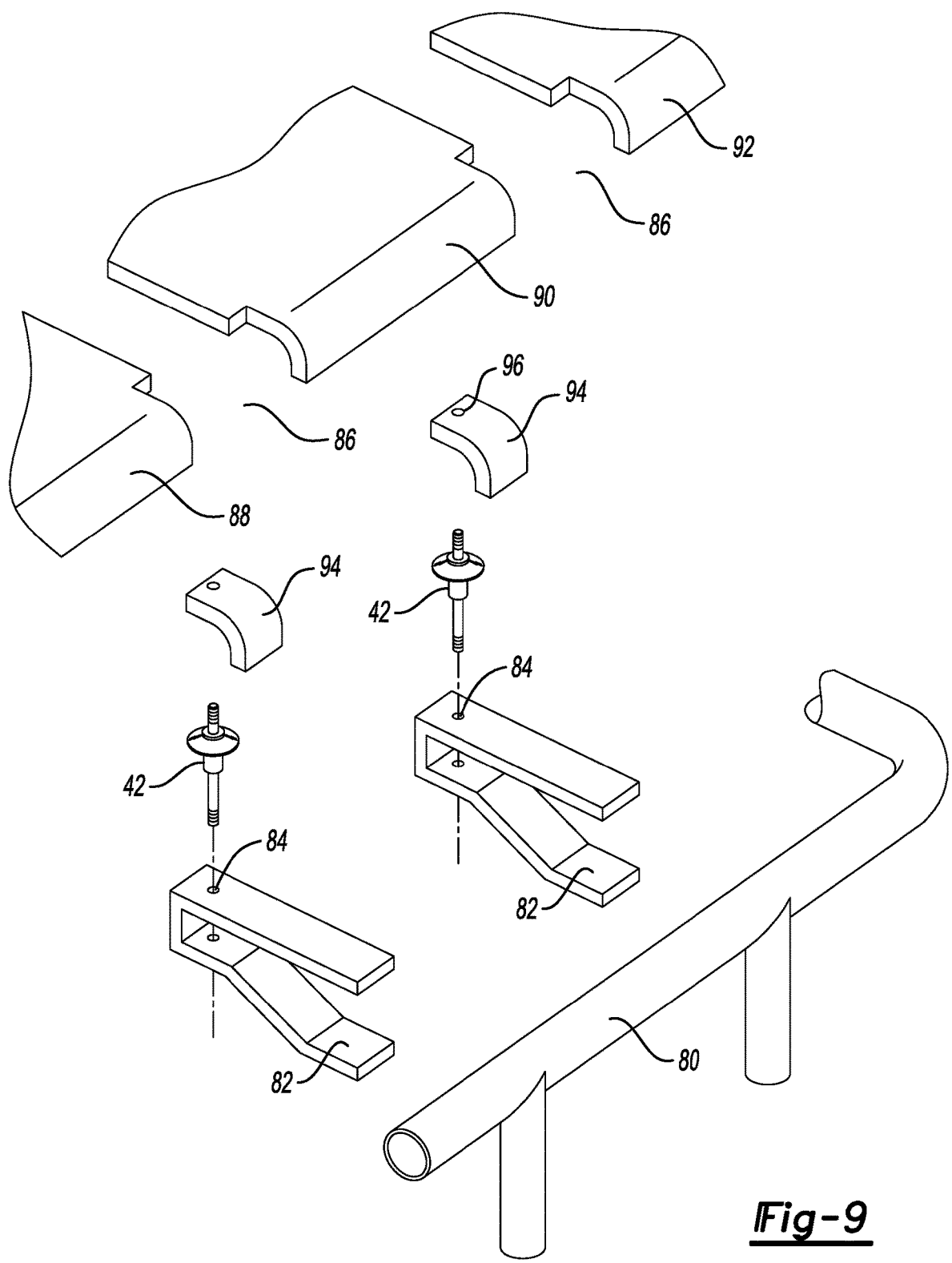
FIG. 9 is a fragmentary exploded perspective view of the embodiment of FIG. 7 including roof panels and trim pieces for covering the brackets adapted to be attached to the roof rails.

Referring to FIGS. 9 and 10, another alternative embodiment is shown that is similar to FIGS. 7 and 8 but includes roof panels that define a notch 86. The roof panels include a front left panel 88, an intermediate panel 90 and a rear panel 92. Cover panels 94 are assembled into the notches to cover the bracket 82 as described with reference to FIGS. 7 and 8. The brackets 82 are welded to the roof rail 26. The pins 42 are secured to the brackets 82 and are received in the openings 84 defined by the brackets 82 and are aligned with an axis extending in a vertical direction. The pins extend through openings 96 defined by the trim panels 94.

In FIG. 9 the pins 42 are shown ready to be installed to support the roof rack 40 as previously described. In FIG. 10 the roof panels 88, 90, and 92 are shown to be attached to the roof rail 26 without the pins 42 for attaching the roof rack 40. The trim panels 94 are shown in the notches 86 and the cap plugs are shown being received in the openings 96 in the trim panels 94.

The roof rack mounting arrangements disclosed above facilitate assembling a roof rack 40 to the roof rails 26 of a vehicle 10 with removable rigid roof panels (e.g. 20 or 90)

installed or not installed. The cargo carrier 40 may be provided in an open air, or convertible mode, or may be provided with the roof 12 covering the passenger compartment. The pins 42 may be removed from the roof panels and replaced by the cap plugs 74 to allow the vehicle 10 to be converted to a vehicle with removable roof panels that does not include a cargo carrier or roof rack 40.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments.

What is claimed is:

1. A method of attaching a cargo carrier to a vehicle that is equipped with removable roof panels comprising:
   attaching pins having a lower end, an intermediate portion, and an upper end to a pair of roof rails on the lower end, wherein the pins extend upwardly from the roof rails;
   attaching a shoulder ring to the intermediate portion of the pins; and
   attaching the cargo carrier to the upper ends of the pins, wherein the lower end, the intermediate portion, and the upper end are parts of the same pins, wherein the cargo carrier may be provided when the roof panels are assembled to the roof rails in a first mode and wherein the cargo carrier may be provided when the roof panels are not assembled to the roof rails in a second mode.

2. The method of claim 1 wherein the roof rails define an opening for each of the pins and the step of attaching the pins to the roof rails includes inserting one of the pins in each of the openings.

3. A method of attaching a cargo carrier to a vehicle that is equipped with removable roof panels comprising:
   welding several brackets to one of a pair of roof rails, wherein the brackets are permanently attached to the roof rails to extend inwardly from the roof rails, and wherein the brackets each define an opening;
   attaching pins having a lower end, an intermediate portion, and an upper end to the opening in the brackets on the lower end, and the step of attaching the pins to the brackets includes inserting the lower end of one of the pins in each of the openings defined by the brackets; and
   attaching the cargo carrier to the upper ends of the pins, wherein the lower end, the intermediate portion, and the upper end are parts of the same pins, wherein the cargo carrier may be provided when the roof panels are assembled to the roof rails in a first mode and wherein the cargo carrier may be provided when the roof panels are not assembled to the roof rails in a second mode.

* * * * *